Feb. 27, 1940.  J. A. DUNFORD  2,191,708
BRIDGE OPERATING MECHANISM
Filed Dec. 18, 1936   3 Sheets-Sheet 1
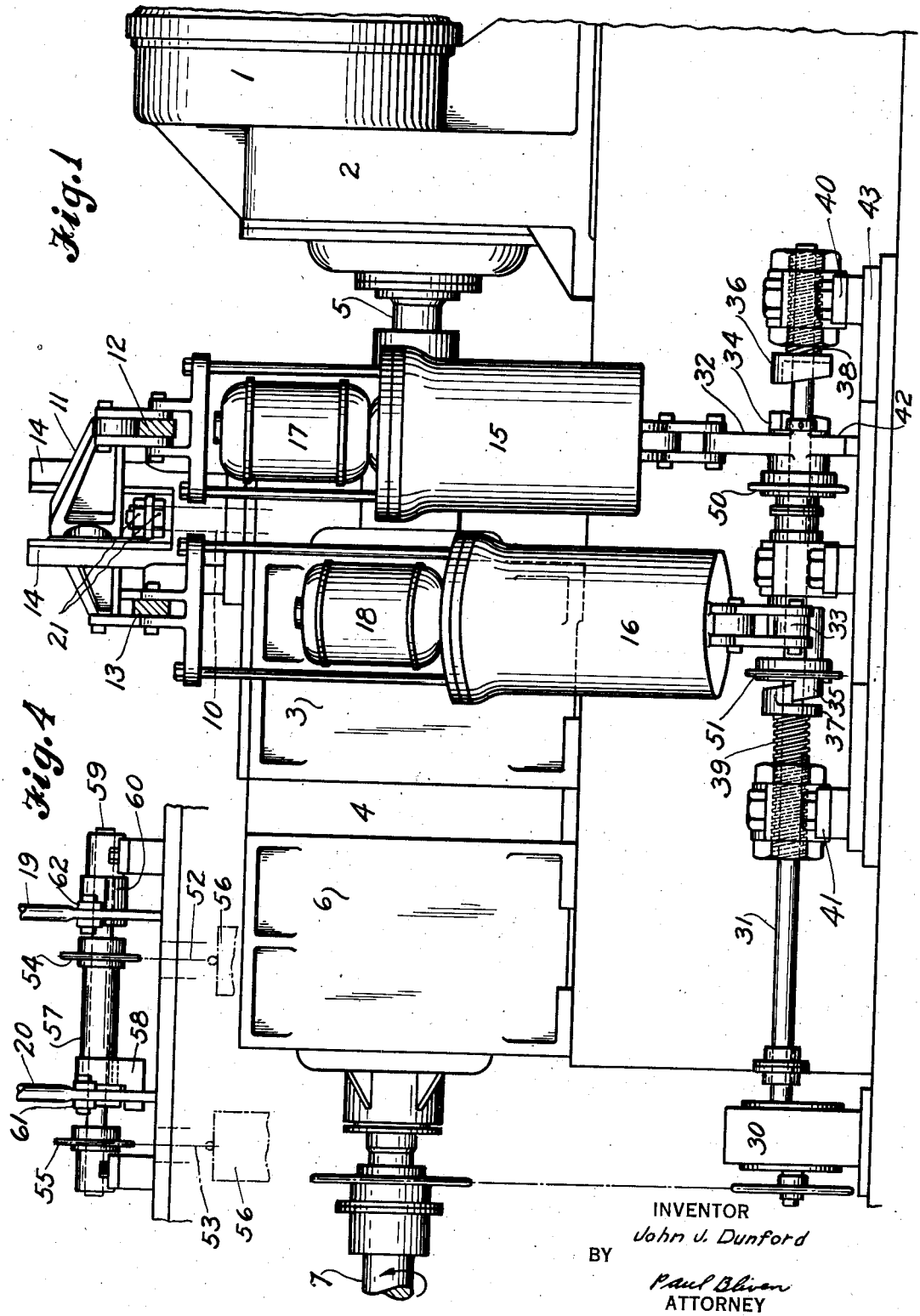
INVENTOR
John J. Dunford
BY
Paul Oliver
ATTORNEY

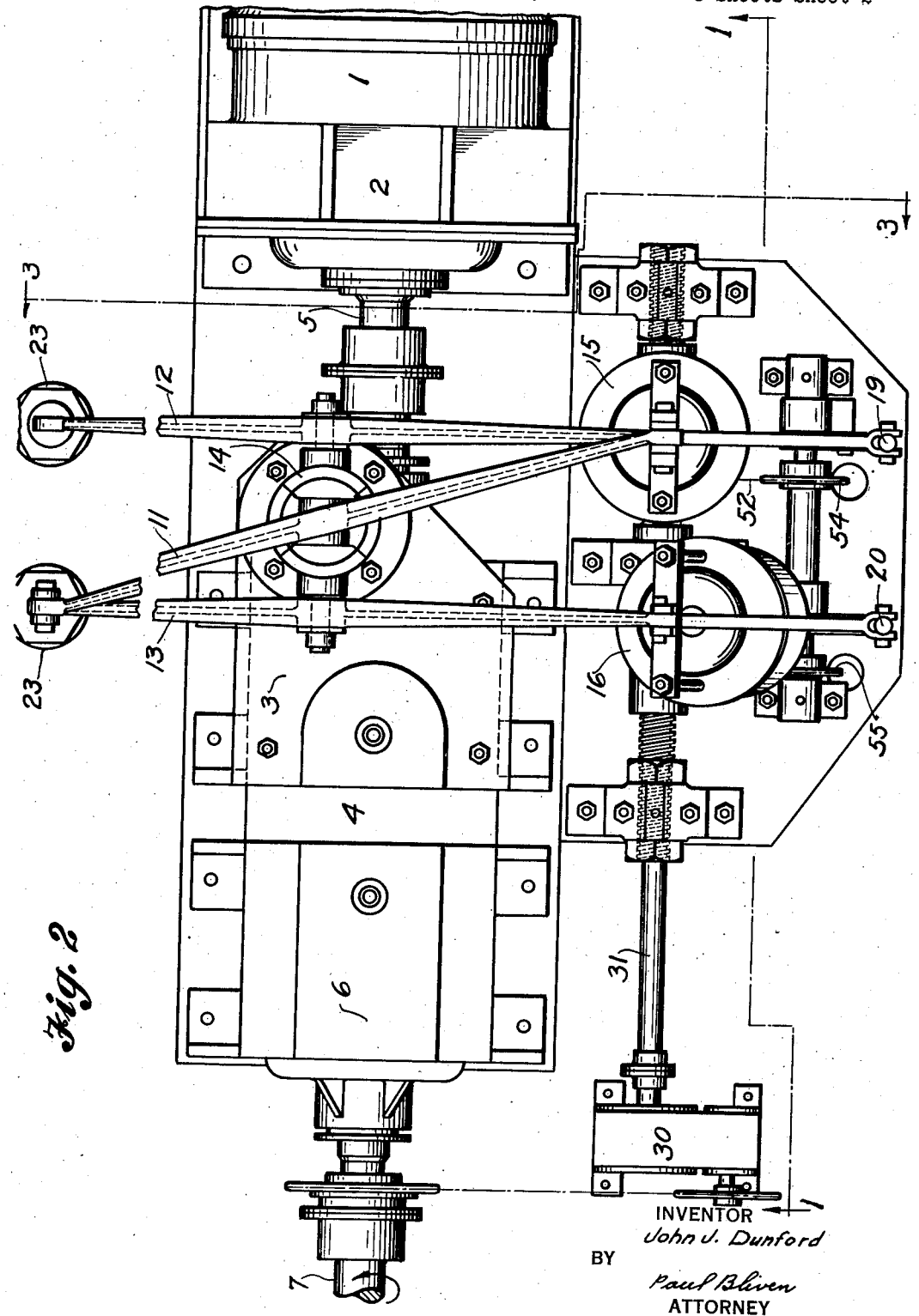

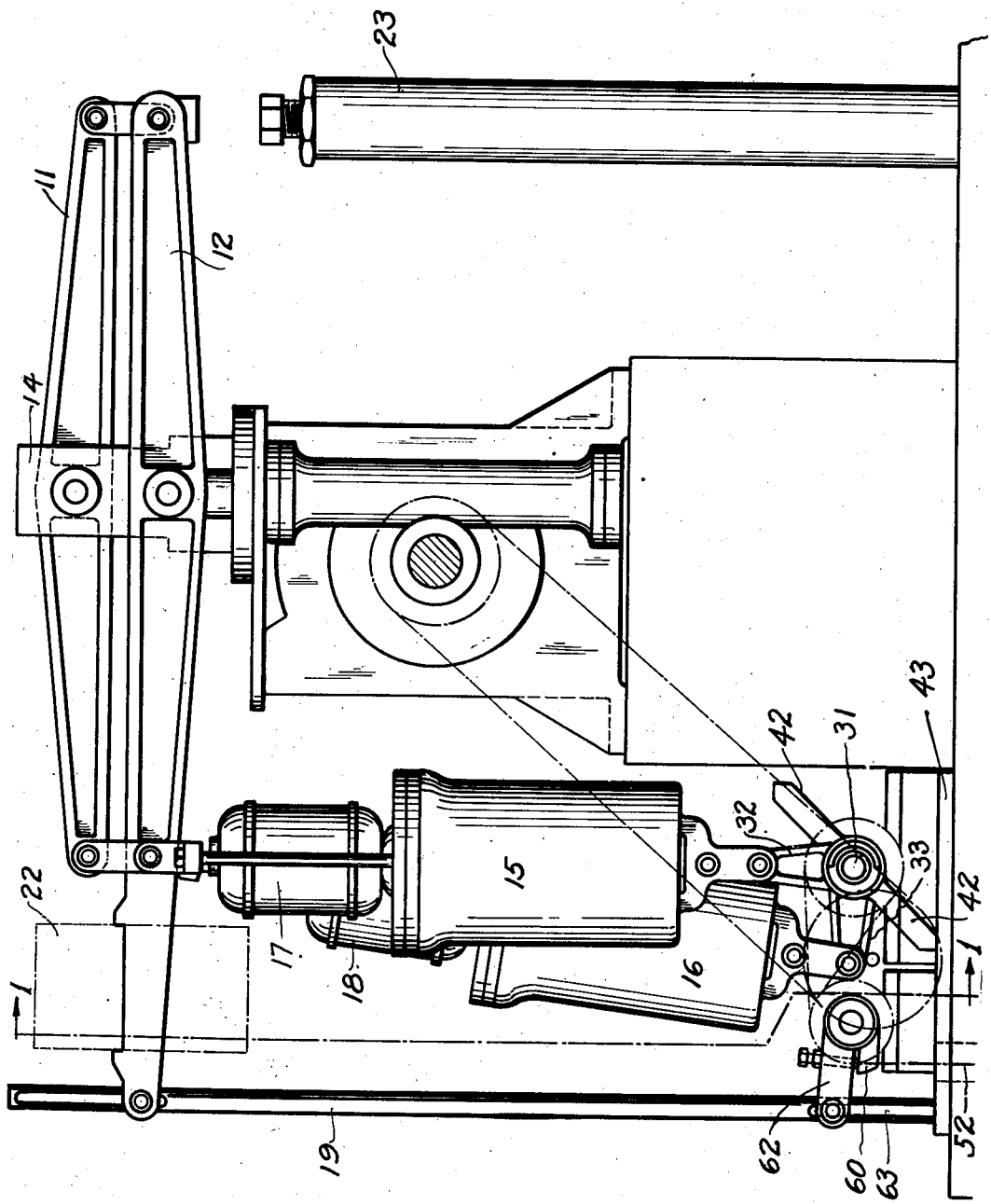

Patented Feb. 27, 1940

2,191,708

UNITED STATES PATENT OFFICE 2,191,708

BRIDGE OPERATING MECHANISM

John A. Dunford, Seattle, Wash.

Application December 18, 1936, Serial No. 116,581

12 Claims. (Cl. 74—479)

Introduction

The present device relates to a bridge operating mechanism. The device herein disclosed may also be used for operating elevators or traction devices.

One of the objects of the present device is to operate a bascule leaf by means of a constant speed motor driving through an infinite ratio, reversible, and self locking transmission.

Another object of the present invention is to provide controls for a transmission such that the output of the transmission may be responsive at any time to manual control, and such that the output may at the same time be responsive to automatically acting limit controls.

Another object of the present invention is to provide the output of the transmission with desirable acceleration and deceleration characteristics.

Another object of the present invention is to provide means for preventing creep of the transmission when the control is at or near the neutral position.

These objects are obtained by driving the bridge or other object through what is known as a "Waterbury hydraulic transmission", or a similar device. The prime mover is preferably an induction motor. By properly controlling the "Waterbury" the bridge may be smoothly accelerated and decelerated. The use of such a transmission obviates the need for the usual braking devices found on bridges and elevators because the transmission is self locking, it cannot be driven back through its output end. The transmission can thus be used as a brake. Control of the acceleration is had by means of oil "Thrustors", or elongatable links. These elongatable links are connected to the control link of the "Waterbury" and due to their gradual expansion give the output of the "Waterbury" a very desirable acceleration characteristic.

Deceleration is accomplished manually by allowing the thruster to slowly collapse. Deceleration automatically is accomplished by taking motion from the output of the transmission and applying it to the control link. This gives a very smooth and desirable deceleration characteristic.

Description

The mechanisms for accomplishing these desired results are shown in the following figures; of which:

Figure 1 is an elevation of the operating mechanism and controls in the line 1—1 of Figure 2.

Figure 2 is a plan view of the operating mechanism and controls.

Figure 3 is an end section on the line 3—3 of Figure 2.

Figure 4 is a detail of a sub-assembly.

The driving motor 1 is preferably of the simple induction type as it can be run by alternating current, is of practically constant speed and is low in price compared with other motors. In the present installation, motor 1 is coupled to a speed reducing unit 2. The speed reducing unit drives directly into the input end 3 of an infinite speed ratio hydraulic transmission 4 of which there are several on the market at the present time. For the present purposes of illustration reference may be had to the type of hydraulic transmission known as the "Waterbury hydraulic variable speed transmission" made by the Waterbury Tool Company of Waterbury, Connecticut, and illustrated in their catalogue No. 122. The driving, or input shaft is shown at 5. This shaft may be considered as part of the input of the transmission. The output 6 of the transmission drives an output shaft 7. This output shaft may be considered as part of the output of the transmission.

The ratio of the output speed to the input speed is controlled by means of a sliding progressive speed control link 10. A progressive speed control is one in which one must pass through all speeds to pass from one limit to the other limit. This link 10 is coupled to a floating link 11 at its midpoint. Connected to the ends of the floating link are auxiliary links 12 and 13. These auxiliary links are pivoted one on each side of the guide 14 of the control shaft, or link. With this arrangement if one auxiliary link is held stationary the other may be moved to give the control link the desired movement.

Manual control of the operation of these links is obtained by means of the elongatable links 15 and 16 which are connected to adjacent ends of the auxiliary links 12 and 13. These elongatable links are of the kind made by the General Electric of Schenectady, New York, and are called by them "Thrustors" and are shown in their bulletin GEH-935. These links are driven by motors 17 and 18 which through oil pumps act to extend the links. The links are contracted by the weight of the applied loads. The rate of expansion and contraction of these links may be regulated by adjusting the size of the passageways through which the impelling oil passes. Each of the auxiliary links has a return stop against which it seats. These stops are shown at 19 and 20. When the two auxiliary links are at rest on these stops the control link is adjusted to be at its neutral position, at which position the output of the transmission will be without motion. This adjustment of the control link may be made by means of the nuts 21. Counterweights 22, shown only in Figure 3, rest on and force the auxiliary links down upon the stops 18 and 19, and aid in contracting the elongatable links.

Positively coupled to the output of the transmission is a speed reducer 30 which drives limit shaft 31. Journaled on the limit shaft 31 are separate throws 32 and 33. Each of these throws supports on its outer end one of the expansible links 15 or 16. Each throw has fastened to it one jaw 34 or 35 of a positive clutch. The other jaw 36 or 37 of the positive clutch is fastened to a traveling nut 38 or 39. The traveling nuts turn with the shaft 31 as they are loosely keyed thereto. The pedestals 40 and 41 contain screw threads complementary to the threads on said traveling nuts. Thus when the shaft 31 turns the traveling nuts will force the jaw clutches into and out of engagement. One jaw clutch will be fully engaged and at its maximum forward movement when the corresponding throw is in a horizontal position, and when the output of the transmission has moved to the maximum desired position. The positive jaw clutches and their actuating mechanisms are designed to move the throws through approximately 90 degrees and to do this as a function of the position of the output of the transmission. The throws have attached to them short arms or stops 42 which are designed to contact the supporting base 43 and to thereby limit the motion of the throws in their raised position.

Applicant has also provided means for preventing creep of the output which might be caused by failure of the control link to entirely return to the neutral position. This is accomplished by securing to the throw 32 the sprocket 50, and to the throw 33 the sprocket 51. Fastened to the sprocket 50 is one end of the chain 52 and fastened to the sprocket 51 is one end of the chain 53. The chain 52 runs over the sprocket 50 while the chain 53 runs under the sprocket 51. The chain 52 is led over sprocket 54 and chain 53 is led over sprocket 55. The other ends of the chains 52 and 53 have placed thereon counterweight 56 for each of said chains. The sprocket 54 is secured to the sleeve 57 which has fastened to it the crank 58. The sprocket 55 is fastened to the shaft 59 which has secured to it the crank 60. The cranks 58 and 60 are adapted to contact the pivoted arms 61 and 62. Arms 61 and 62 are loosely pivoted on the shaft 59. The ends of the arms 61 and 62 fit in slots 63 cut in the lower ends of the stops 19 and 20. The ends of the arms are adapted to contact the upper ends of the slots 63.

*Operation*

In operating the mechanism from the position shown in the drawings, the induction motor 1 is started and allowed to come up to speed then the motor 17 is started which will actuate the expansible link 15. As the link 15 gradually extends it will move the auxiliary link 12 about its pivot, pivot the floating link 11 about its end fastened to the auxiliary link 13, and move the control link upward from its neutral position. Movement of the control link upward will cause the transmission to operate and the output shaft 7 to rotate in the direction shown by the arrow. This motion of the shaft 7 is reduced by appropriate gearing and transmitted to the shaft 31.

This motion will cause the clutch jaws 37 and 35 to rotate a distance of about 90 degrees so as to raise the throw 33 just over the vertical position against its stop 42. When the throw 33 is in a vertical position the clutch will disengage and the jaw 37 will move along the shaft 31 away from the complementary jaw 35. As the throw 33 raises, the link 16 will, due to weight 22, be contracted and the auxiliary link 13 will continue to rest on its stop 20. As the shaft 31 continues to rotate the jaw 36 will turn therewith and approach the complementary jaw 34 which is fixed to the throw 32. The jaw 36 will engage with the jaw 34 at a predetermined point in the travel of the output of the transmission. At this point the throw 32 will begin to move and drop downward the expansible link 15. Dropping of the expansible link 15 will cause the control valve to return toward its neutral position. The return of the control valve toward its neutral position will decrease the speed of the transmission output which in turn will decrease the speed with which the throw 32 is moving. The result of these combinations of motions is that the speed of the output is gradually reduced and the output creeps into the desired limiting position. When this limiting position has been reached the positions of the links 15 and 16 will be reversed from that shown in the drawings. In this position the motor 17 is shut off and the motor 18 started whereupon the previously described movements will again take place and the output of the transmission will be returned to its starting limit shown in the drawings. In this reverse movement, extension of the link 16 will move the control link 10 downward from its neutral position in order to initiate the movement which will be carried through in the same manner as previously described due to the actuation of the link 15.

Extension of the links 15 and 16 is limited by the adjustable stops 23. Stops 23 thus act as means for controlling the output speed of the transmission.

The movement of the auxiliary links 12 and 13 away from the stops 23 and into the neutral position, is limited by the stops 19 and 20. If movement of one of the links, say the link 13, against its stop 20 does not bring the control link all the way to the neutral position, which would allow the output end to slowly creep, the mechanism or the bridge would be broken. This condition could be remedied by raising the other stop 19 which would lift the control link into neutral position. Applicant has obtained this compensating feature by fastening the chains 52 and 53 to the throws 32 and 33. As the throws move they will through their corresponding chains move the cranks 58 and 60. If the throw 33 were to move downward from the position shown in Figure 1 the crank 60 would rise and through the arm 62 contact the end of the slot 63 in the stop 19, and thereby reposition it. This would in turn cause the auxiliary link 12 and the floating link 11 to rise and bring the control link to its neutral position. Bringing the control link to neutral position will stop movement of the crank 60.

During the operation of the device between the limits set by the action of the jaw clutches, it may be desired to stop the motion of the output of the transmission. This is done by cutting off the power to whichever one of the motors 17 or 18 which is operating at that time. This will allow the corresponding link 12 or 13 to return to its stop 19 or 20 under the action of a counterweight 22, and to collapse the expansible link.

The acceleration and deceleration characteristics resulting from manual control operating through the expansible links when unaffected by the motion of the throws 32 and 33, may be varied by operating both the motor 17 and 18 at the same time and by using the resulting motion of the expansible links to operate the control link. Operation of both motors 17 and 18 when the output is at one of its limits will result in a combination of the motions of the two links and of the throw. Also, the motion of one link and of one of the throws may be combined. The rate of flow of the oil in the "Thrustors" may be regulated to obtain various characteristics of acceleration in the transmission.

By "elongatable" I mean either extension or contraction. In the use of the terms "variable, vary, or varying" I mean that the change from one position or speed to another is continuous, the curve representing such change is a smooth curve.

Having thus described my invention, I claim:

1. In a variable speed reversible transmission, having: a progressive speed control link with a neutral position, a forward position, and a reverse position, the combination of: a floating link fastened at its mid-portion to said control link; a first expansible link and a link having a fixed pivot point, connected to one end of said floating link so that extension of said expansible link will move said control link into forward position away from said neutral position; a second expansible link and a link having a fixed pivot point, connected to the other end of said floating link so that extension of said expansible link will move said control link in the reverse direction; stop means limiting the contraction of said expansible links and defining the neutral position of said control link; and stop means limiting the extension of said expansible links and defining the limits of progression of said control link from its neutral position.

2. An operating mechanism, comprising: a variable speed reversible transmission, having: an input shaft, an output shaft, and a progressive speed control link with a neutral position, a forward position, and a reverse position; a prime mover connected to said input; a floating link fastened at its mid point to said control link; a first expansible link connected to one end of said floating link so that extension of said expansible link will move said control link into forward position away from said neutral position; a second expansible link connected to the other end of said floating link so that extension of said link will move said control link in the reverse direction; throws supporting said expansible links; a shaft bearing said throws; two positive jaw clutches having one jaw of each clutch fastened to each of said throws; traveling nuts mounted on said shaft and having the other jaw of each of said clutches fastened thereto; loose keys forcing said nuts to rotate with said shaft; pedestals mounting said nuts and providing complementary screw threads for said nuts; said threads, nuts, and clutches being so arranged that upon complete engagement of one clutch and rotation of the corresponding throw the desired amount, the nut carrying the other clutch will be in complete disengagement, and vice versa; and means for driving said shaft from said output shaft.

3. In a variable speed reversible transmission, having: an input, an output, and a progressive speed control link with a neutral position, a forward position, and a reverse position, the combination of: a floating link fastened at its mid-portion to said control link; means for moving one end of said floating link from and to a fixed point; means for moving the other end of said floating link in the opposite direction from and to a fixed point; stop means defining said fixed points; said control link being in its neutral points when said means for moving are at said stop means; and means controlled by the output of said transmission for repositioning said stops.

4. In a variable speed reversible transmission, having: an input, an output, and a progressive speed control link, with a neutral position, a forward position and a reverse position, the combination of: a floating link adapted to be connected to and to actuate said control link; a stop; means connected to said floating link and having movement from and to said stop; a second stop; and a second means connected to said floating link and having movement from and to said further stop; the movement of one of said means from its related stop giving said control link a motion opposite to that given it by the motion of the other means from its related stop; said stops defining said neutral position when said means are in contact therewith; and means coupled to said output and to said stops to reposition said stops if said stops do not define said neutral position.

5. An operating mechanism, comprising: a variable speed transmission, having: an input, an output, and a progressive speed control link with a neutral position; an expansible link for moving said control link from said neutral position; and means controlled by the approach of said output to a desired limit of operation for moving the whole of said expansible link to return said control link to its neutral position.

6. An operating mechanism, comprising: a variable speed transmission, having an input, an output, and a progressive speed control link with a neutral position; a floating link fastened to said control link; stops associated with said floating link which define the neutral position of said speed control link; separate expansible links for controlling the movement of said floating link from each of said stops; and means controlled by the approach of said output to a desired limit of operation for moving the whole of either of said expansible links to return said speed control link to its neutral position.

7. An operating mechanism, comprising: a variable speed reversible transmission, having: an input shaft, an output shaft, and a progressive speed control link with a neutral position, a forward position, and a reverse position; a floating link fastened to said control link; an expansible link connected at one end to said floating link for operation of said control link; and means connected to said output shaft for positioning the other end of said expansible link.

8. An operating mechanism, comprising: a variable speed reversible transmission, having: an input shaft, an output shaft, and a progressive speed control link with a neutral position, a forward position, and a reverse position; stops defining said positions; means for selectively moving said speed control link into said positions; and means actuated by said output shaft for repositioning a neutral position stop if said output creeps after said control link has been returned to neutral position.

9. An operating mechanism, comprising: a variable speed reversible transmission, having an input shaft, an output shaft, and a progressive speed control link with a neutral position, a forward position, and a reverse position; a floating link fastened to said control link; expansible links actuating said floating link; links having fixed pivot points connected to said floating link; and stops associated with said links and defining said neutral, forward, and reverse positions.

10. An operating mechanism, comprising: a variable speed reversible transmission, having: an input shaft, an output shaft, and a progressive speed control link with a neutral position, a forward position, and a reverse position; a floating link fastened to said control link; an expansible link connected at one end to said floating link for operation of said control link; a throw supporting the other end of said expansible link; means connected to said output shaft for rotating said throw; a stop limiting rotation of said throw; and means for tensioning said throw for movement to said stop.

11. An operating mechanism, comprising: a variable speed reversible transmission, having: an input shaft, an output shaft, and a progressive speed control link with a neutral position, a forward position, and a reverse position; a floating link fastened to said control link; a first expansible link connected to said floating link; a second expansible link connected to said floating link; throws supporting said expansible links; a shaft bearing said throws; two jaw clutches having one jaw of each clutch fastened to each of said throws; traveling nuts mounted on said shaft and having the other jaw of each of said clutches fastened thereto; loose keys forcing said nuts to rotate with said shaft; pedestals mounting said nuts and providing complementary screw threads for said nuts; said nuts and clutches being so arranged that upon complete engagement of one clutch and rotation of the corresponding throw the desired amount, the nut carrying the other clutch will be in complete disengagement, and vice versa; and means for driving said shaft from said output shaft.

12. An operating mechanism, comprising: a variable speed reversible transmission, having: an input shaft, an output shaft, and a progressive speed control link with a neutral position, a forward position, and a reverse position; a neutral position stop; means for selectively moving said speed control link into said positions; and means actuated by said output shaft for repositioning said neutral position stop if said output creeps after said control link has been returned to neutral position.

JOHN A. DUNFORD.